(12) United States Patent
Somal et al.

(10) Patent No.: US 11,757,734 B1
(45) Date of Patent: Sep. 12, 2023

(54) QUALITY OF EXPERIENCE (QOE) SCORING IN A SERVICE PROVIDER NETWORK

(71) Applicant: CSC Holdings, LLC, Bethpage, NY (US)

(72) Inventors: Shashank Somal, Levittown, NY (US); Rajesh Khandelwal, Princeton Junc., NJ (US)

(73) Assignee: CSC Holdings, LLC, Bethpage, NY (US)

( * ) Notice: Subject to any disclaimer, the term of this patent is extended or adjusted under 35 U.S.C. 154(b) by 132 days.

(21) Appl. No.: 17/174,878

(22) Filed: Feb. 12, 2021

(51) Int. Cl.
*H04W 24/08* (2009.01)
*H04L 41/5067* (2022.01)
*H04L 43/0817* (2022.01)
*H04W 24/02* (2009.01)

(52) U.S. Cl.
CPC ...... *H04L 41/5067* (2013.01); *H04L 43/0817* (2013.01); *H04W 24/02* (2013.01); *H04W 24/08* (2013.01)

(58) Field of Classification Search
CPC .......... H04L 41/5067; H04L 43/0817; H04W 24/02; H04W 24/08
See application file for complete search history.

(56) References Cited

U.S. PATENT DOCUMENTS

| | | | |
|---|---|---|---|
| 2011/0149775 A1* | 6/2011 | Lee | H04L 41/5067 370/252 |
| 2016/0028594 A1* | 1/2016 | Ramakrishnan | H04L 65/765 709/224 |
| 2016/0028647 A1* | 1/2016 | Ramakrishnan | H04L 67/02 709/226 |
| 2017/0244777 A1* | 8/2017 | Ouyang | H04L 41/5067 |
| 2018/0109819 A1* | 4/2018 | Lu | H04N 21/2387 |
| 2020/0336396 A1* | 10/2020 | Su | H04L 41/5067 |

* cited by examiner

Primary Examiner — Hassan Kizou
Assistant Examiner — Hector Reyes
(74) Attorney, Agent, or Firm — Sterne, Kessler, Goldstein & Fox P.L.L.C.

(57) ABSTRACT

Systems, methods, and apparatuses disclosed herein can evaluate collections of operational information received from one or more subscriber devices to determine one or more Quality of Experience (QoE) scores for the one or more subscriber devices and/or one or more subscriber premises that are associated with the one or more subscriber devices. Generally, the one or more QoE scores can represent one or more numerically quantitative measures relating to the facilitation of a service by a service provider system. In some embodiments, the one or more QoE scores can represent one or more numerically quantitative measures relating to the experience of one or more subscribers that are associated with the one or more subscriber devices. In these embodiments, the one or more QoE scores can represent numerically quantitative measures of the subjective experience, for example, satisfaction or unsatisfaction, of the one or more subscribers with the service.

16 Claims, 5 Drawing Sheets

Figure 1:
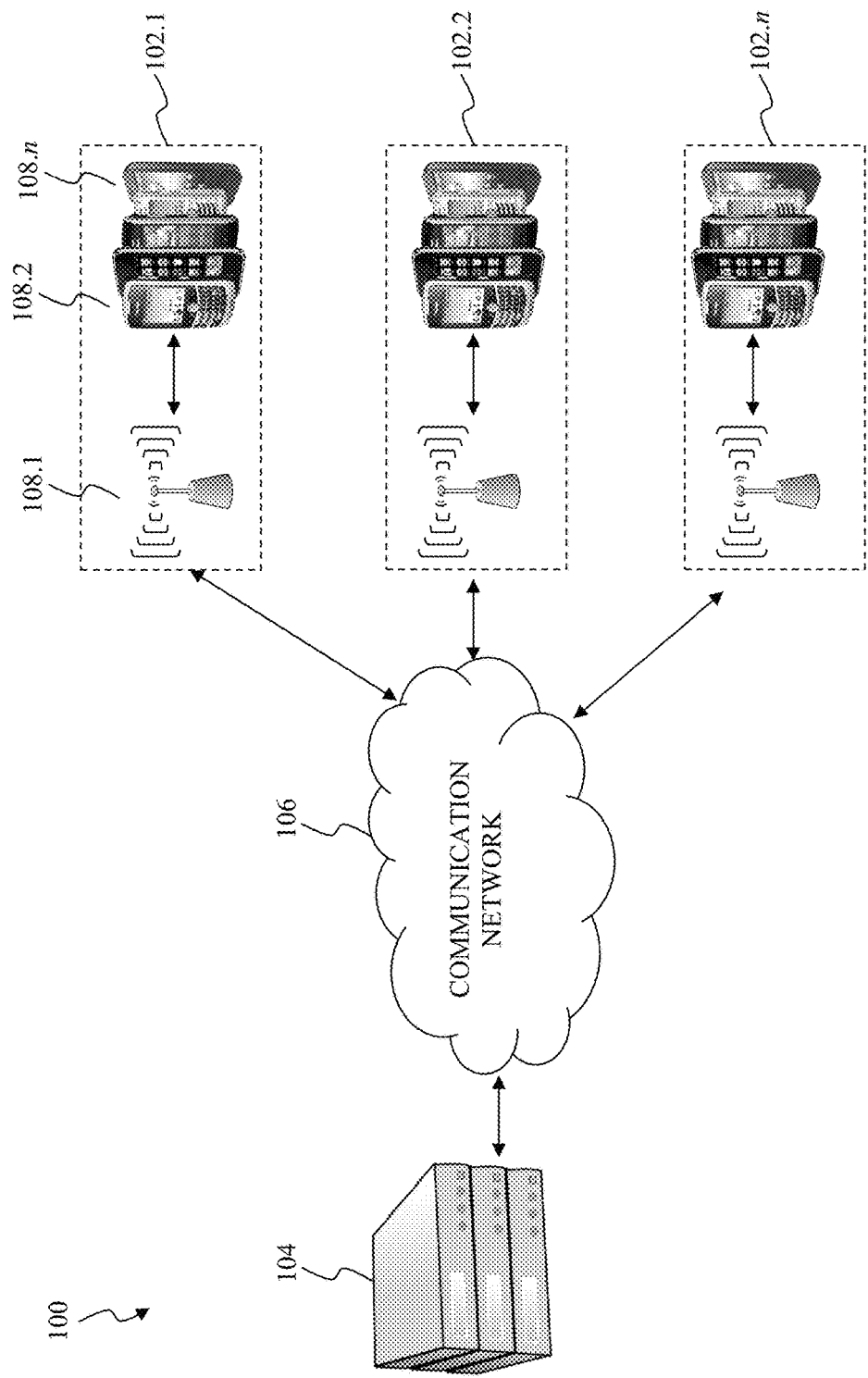

| DEVICE_ID | RSSI | FREQUENCY BAND |
|---|---|---|
| 00:06:91.7A0F:7F | -80 dBm | 2 GHz Band |
| 00:06:91.7A0F:7F | -80 dBm | 2 GHz Band |
| ⋮ | ⋮ | ⋮ |
| 00:06:91.7A0F:7F | -70 dBm | 2 GHz Band |
| 00:06:91.7A0F:7F | -70 dBm | 2 GHz Band | ly, the one or more subscriber devices can periodically capture operational information relating to their operation once every five (5) to ten (10) minutes. Conventionally, the one or more subscriber devices aggregate their operational information over a twenty-four (24) hour period of time and thereafter deliver their operational information to the service provider network once every twenty-four (24) hours.

QUALITY OF EXPERIENCE (QOE) SCORING IN A SERVICE PROVIDER NETWORK

BACKGROUND

A service provider network provides a service, such as communication of video, audio, and/or data to provide some examples, to one or more subscriber devices associated with a subscriber of the service. Typically, the one or more subscriber devices can periodically capture operational information relating to their operation once every five (5) to ten (10) minutes. Conventionally, the one or more subscriber devices aggregate their operational information over a twenty-four (24) hour period of time and thereafter deliver their operational information to the service provider network once every twenty-four (24) hours.

In some situations, the subscriber of the service contacts personnel of the service provider network to indicate the service is not performing as expected. Often times, the amount of operational information delivered to service provider network can overwhelm the personnel of the service provider network. As an example, one service provider network can receive operational information from many hundreds of thousands of different subscribers, and even millions of different subscribers, with each of these subscribers being potentially associated with multiple subscriber devices. In some situations, the service provider network typically receives hundreds of gigabytes (GBs), and sometimes even terabytes (TBs), of operational information from these subscribers once every twenty-four (24) hours which is many hundreds of kilobytes (kBs), for example, approximately (300) kBs, of operational information per subscriber every twenty-four (24) hours. And, the amount of operational information received by the service provider network increases as more and more subscribers enter into the service.

The service provider network often stores the operational information received from these subscriber devices in a tablet format that encompasses numerous tables, for example, thirty-two (32) tables, with each these tables having many millions, for example, thirty (30) million, of rows to store operational information every twenty-four (24) hours. As such, the personnel of the service provider network often need to search through the million rows of these numerous tables, for example, nine hundred sixty (960) million rows, to locate the most recent operational information for the subscriber over the most recent twenty-four (24) hour period of time. Often times, the personnel of the service provider network piece together operational information received over multiple days, weeks, or even months to identify underlying causes for the service not performing as expected. And in some situations, the underlying causes for the service not performing as expected can result can be related to the operation of multiple subscriber devices that are associated with the subscriber. This requires the personnel of the service provider network to piece together operational information of these multiple subscriber devices to identify the underlying causes for the service not performing as expected.

BRIEF DESCRIPTION OF THE DRAWINGS/FIGURES

Figure 2:
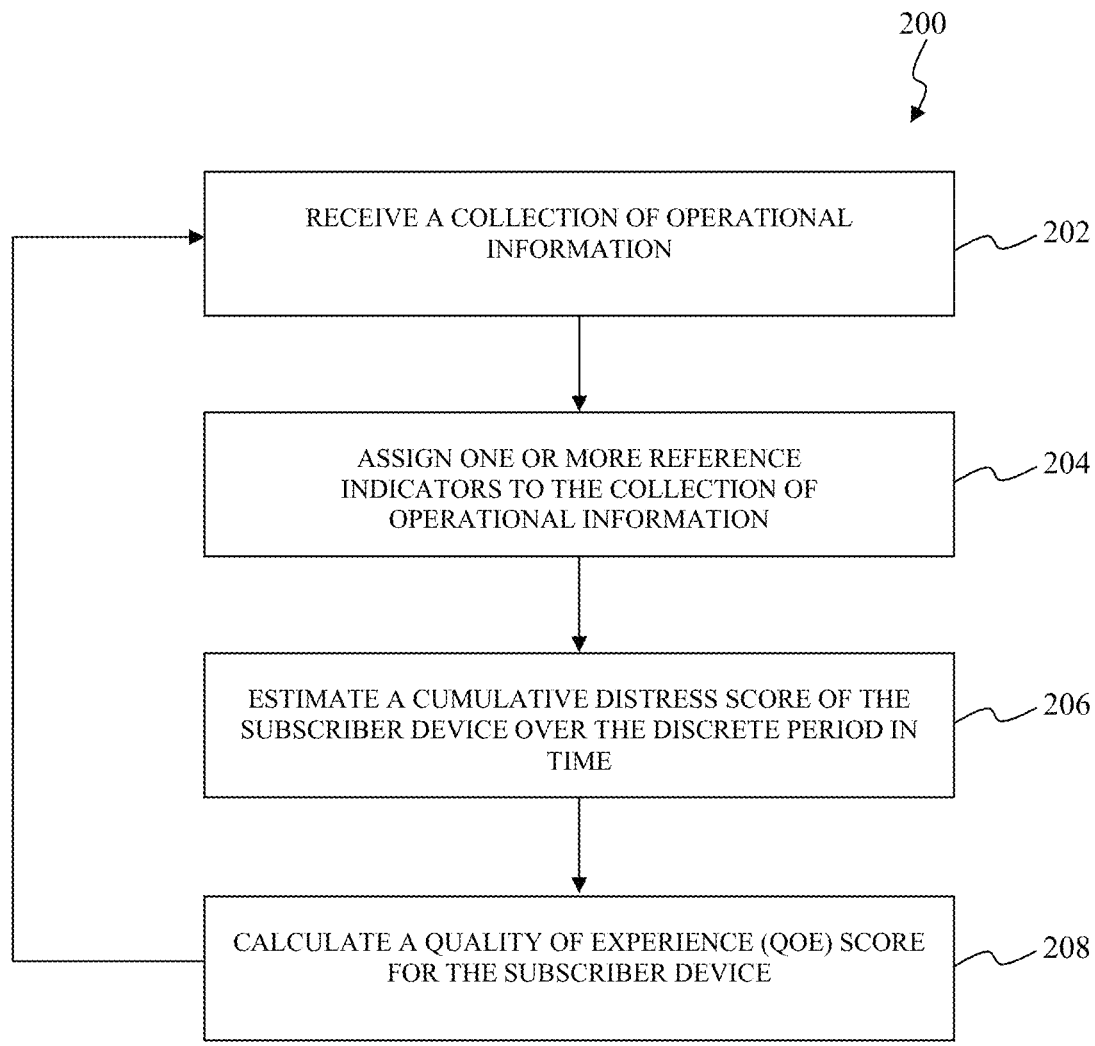
Figure 3:
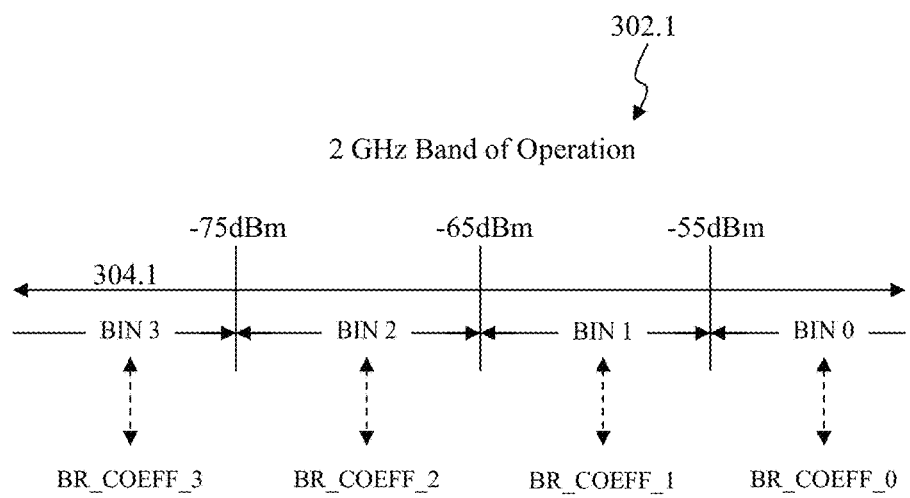
Figure 3:
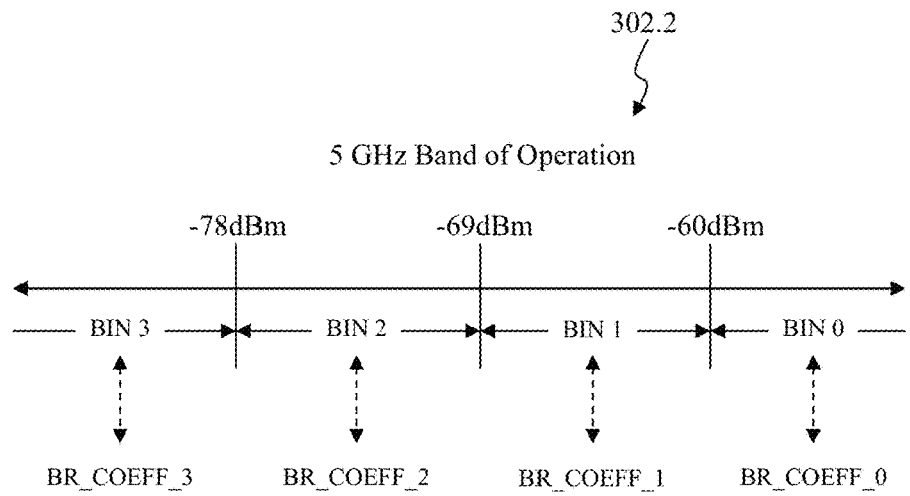
Figure 4:
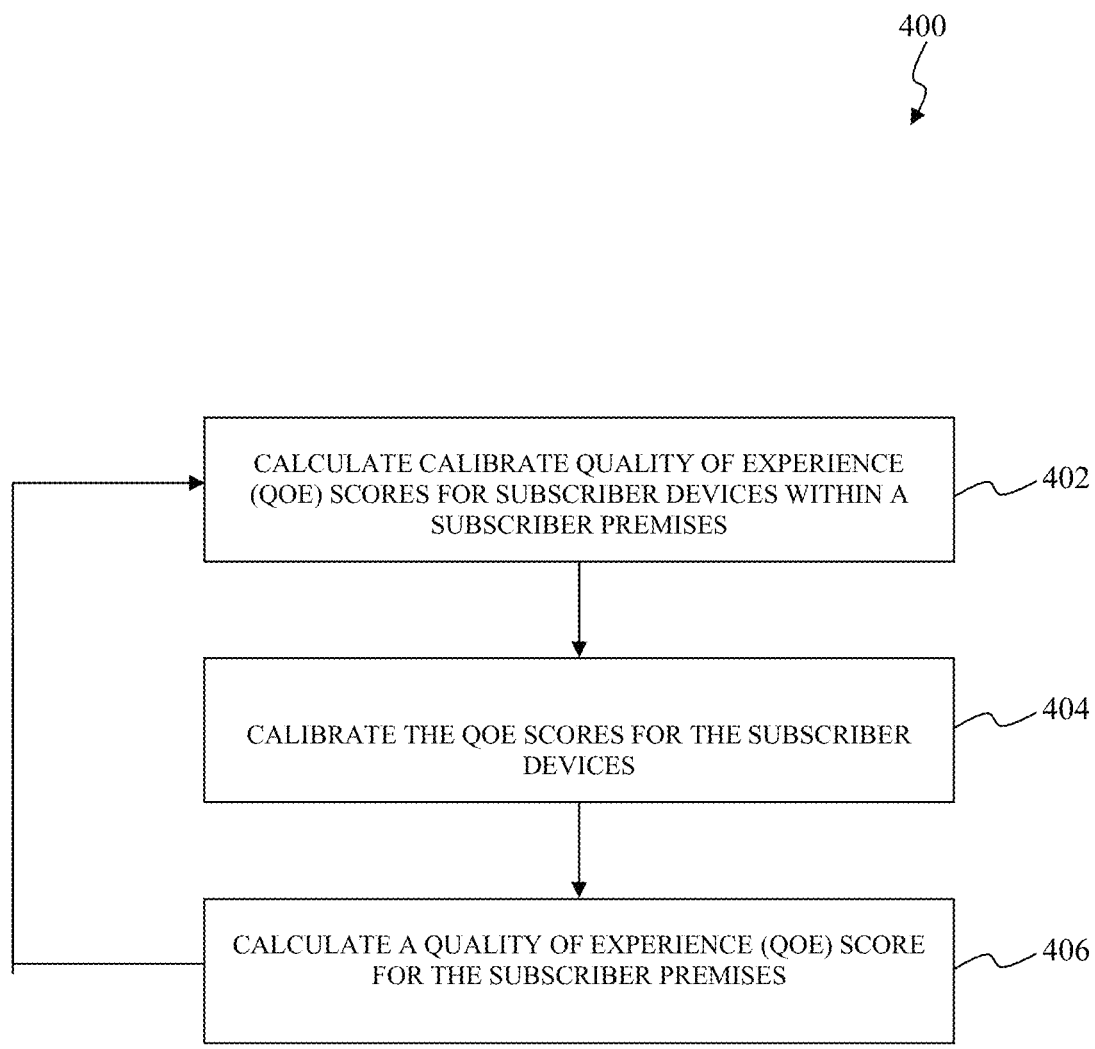
Figure 5:
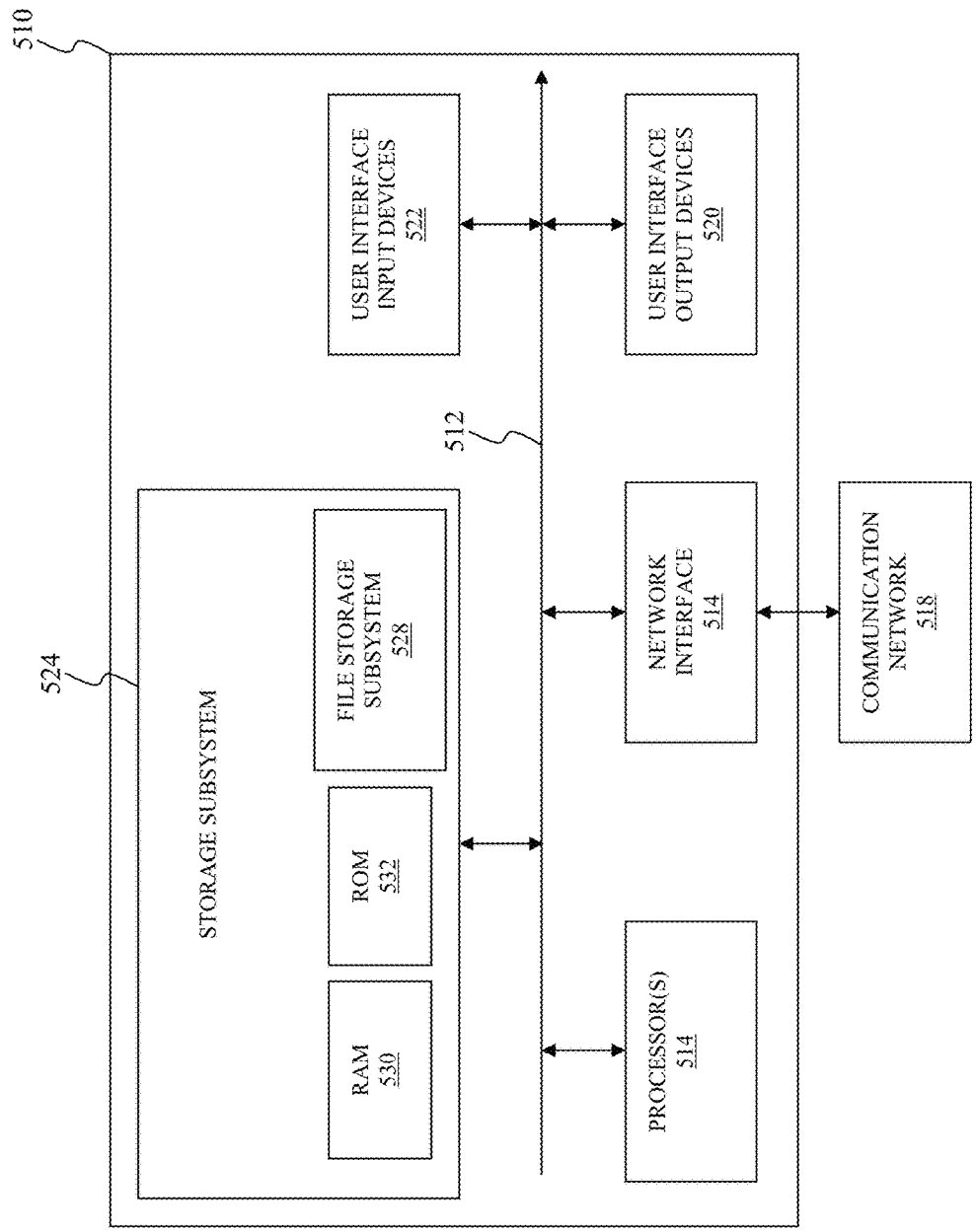

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1 graphically illustrates an exemplary service provider network according to some exemplary embodiments of the present disclosure;

FIG. 2 illustrates a flowchart of a first exemplary Quality of Experience (QoE) scoring that can be performed by a service provider system within the exemplary service provider network according to some exemplary embodiments of the present disclosure;

FIG. 3 further illustrates some of the first exemplary QoE scoring that can according to some exemplary embodiments of the present disclosure;

FIG. 4 illustrates a flowchart of a second exemplary Quality of Experience (QoE) scoring that can be performed by a service provider system within the exemplary service provider network according to some exemplary embodiments of the present disclosure; and FIG. 5 graphically illustrates a simplified block diagram of a computer system suitable for use with embodiments described herein, as well as circuit design and circuit embodiments of the technology, according to some exemplary embodiments of the present disclosure.

The present disclosure will now be described with reference to the accompanying drawings.

DETAILED DESCRIPTION OF THE DISCLOSURE

Overview

Systems, methods, and apparatuses disclosed herein can evaluate collections of operational information received from one or more subscriber devices to determine one or more Quality of Experience (QoE) scores for the one or more subscriber devices and/or one or more subscriber premises that are associated with the one or more subscriber devices. The one or more QoE scores allow personnel of a service provider network to quickly and easily evaluate performance of these subscriber devices and/or subscriber premises. Generally, the one or more QoE scores can represent one or more numerically quantitative measures relating to the facilitation of a service by the service provider system. In some embodiments, the one or more QoE scores can represent one or more numerically quantitative measures relating to the experience of one or more subscribers that are associated with the one or more subscriber devices. In these embodiments, the one or more QoE scores can represent numerically quantitative measures of the subjective experience, for example, satisfaction or unsatisfaction, of the one or more subscribers with the service.

Exemplary Service Provider Network

FIG. 1 graphically illustrates an exemplary service provider network according to some exemplary embodiments of the present disclosure. In the exemplary embodiment illustrated in FIG. 1, a service provider network 100 provides electronic communication between subscriber premises 102.1 through 102.*n* and a service provider system 104 via a communication network 106. In some embodiments, the service provider system 104 can be characterized as providing a bi-directional communication of information, such as video, audio, and/or data to provide some examples, also referred to as a service, to the subscriber premises 102.1 through 102.*n*. As to be described in further detail below, the service provider system 104 can capture operational information relating to the configuration and/or the operation of one or more subscriber devices within the subscriber premises 102.1 through 102.n and thereafter can evaluate this operational information to provide one or more Quality of Experience (QoE) scores for these subscriber devices and/or the subscriber premises 102.1 through 102.n. In the exemplary embodiment illustrated in FIG. 1, the one or more QoE scores can represent one or more numerically quantitative measures relating to the delivery of the service by the service provider system 104. In some embodiments, the one or more QoE scores can include one or more subscriber premise QoE scores relating to the subscriber premises 102.1 through 102.n and/or one or more electronic media device QoE scores relating to one or more subscriber devices within the subscriber premises 102.1 through 102.n.

In the exemplary embodiment illustrated in FIG. 1, the subscriber premises 102.1 through 102.n represent building and/or non-building structures that receive a service from the service provider network 100. Generally, the one or more building structures refer to any suitable structure or structures that are designed for human occupancy and can include one or more residential, industrial, and/or commercial building structures to provide some examples. Generally, the one or more non-building structures refer to any suitable structure or structures that are not designed for human occupancy and can include one or more residential, industrial, and/or commercial non-building structures to provide some examples. In an exemplary embodiment, the subscriber premises 102.1 through 102.n represent building and/or non-building structures that are associated with one or more subscribers that have entered into service agreements with a service provider operating the service provider network 100 to provide the service. The service agreements often define quality of service (QoS), for example, speeds of the downstream direction or speeds of the upstream direction, between corresponding subscriber premises from among the subscriber premises 102.1 through 102.n and the service provider system 104.

As illustrated in FIG. 1, each of the subscriber premises 102.1 through 102.n can include subscriber devices 108.1 through 108.n. In some embodiments, the number of subscriber devices 108.1 through 108.n within each of the subscriber premises 102.1 through 102.n can be the same as one another and/or the number of subscriber devices 108.1 through 108.n within each of the subscriber premises 102.1 through 102.n can differ from one another. In the exemplary embodiment illustrated in FIG. 1, the subscriber devices 108.1 through 108.n can represent one or more mechanical, electrical, or electromechanical devices that are capable of receiving information, for example, video, audio, and/or data, in a downstream direction from the service provider system 104 and/or transmitting information, for example, video, audio, and/or data, in an upstream direction to the service provider system 104. As used herein, the downstream direction refers to the transfer of information from the service provider system 104 to the subscriber premises 102.1 through 102.n. As used herein, the upstream direction refers to the transfer of information from the subscriber premises 102.1 through 102.n to the service provider system 104. In some embodiments, the subscriber devices 108.1 through 108.n can include set-top boxes, gateways, routers, network bridges, modems, wireless access points, line drivers, switches, hubs, repeaters, mobile telephony devices, such as mobile phones; mobile computing devices; mobile internet devices, such as tablet computers and/or laptop computers; video game consoles; portable media players; peripheral devices, such as mice, keyboards, monitors, printers and/or scanners; internet capable appliances and/or other suitable mechanical, electrical, or electromechanical devices that are capable of wireless and/or wireline communication that will be recognized by those skilled in the relevant art(s) without departing from the spirit and scope of the present disclosure.

In the exemplary embodiment illustrated in FIG. 1, one or more subscriber devices from among the subscriber devices 108.1 through 108.n can capture operational information relating to their operation. For example, the operational information can include one or more signal metrics, such as one or more means, one or more total energies, one or more average powers, one or more mean squares, one or more instantaneous powers, one or more root mean squares, one or more variances, and/or one or more norms to provide some examples, of various signals and/or noise within the service provider network 100; the amount of information, typically expressed in megabytes (MBs) or gigabytes (GBs), transferred to and/or from the one or more subscriber devices; the number of and/or durations in time that the subscriber devices 108.1 through 108.n are associated, or attached, to the service provider system 104; the number of subscriber devices from among the subscriber devices 108.1 through 108.n; and/or other suitable characteristics, parameters, and/or attributes that relate to the operation of the subscriber premises 102.1 through 102.n and/or the subscriber devices 108.1 through 108.n that will be apparent to those skilled in the relevant art(s) without departing from the spirit and scope of the present disclosure.

In the exemplary embodiment illustrated in FIG. 1, the one or more subscriber devices can periodically capture their operational information at discrete intervals in time, for example, multiple times every day, once every few minutes, once every hour, once every few hours, once every day, once every couple of days, once every week, once every couple of weeks, once every month, and/or once every couple of months to provide some examples. Although the disclosure herein is described in terms capturing operational information at the discrete intervals in time, those skilled in the relevant art(s) will recognize that the one or more subscriber devices can alternatively, or additionally, capture their operational information in response to a detecting one or more changes in one or more operational conditions of the service provider network 100, for example, detecting changes in the one or more signal metrics of the various signals and/or the noise within the service provider network 100, without departing from the spirit and scope of the present disclosure. In an exemplary embodiment, the one or more subscriber devices can periodically capture their operational information once every five (5) to ten (10) minutes. In some embodiments, the one or more subscriber devices can aggregate their operational information over a discrete period in time, for example, once every few minutes, once every hour, once every few hours, once every day, once every couple of days, once every week, once every couple of weeks, once every month, and/or once every couple of months to provide some examples to generate one or more collections of operational information. In these embodiments, each collection of operational information can include multiple segments of operational information that were captured at the discrete intervals in time over the discrete period in time. In an exemplary embodiment, the one or more subscriber devices can aggregate their operational information over a twenty-four (24) hour period of time to generate a collection of operational information having one thousand four-hundred forty (1440) segments of operational information that have been captured by the subscriber device once every five (5) to ten (10) minutes over the twenty-four (24) hour period of time. In some embodiments, one or more subscriber devices from among the subscriber devices 108.1 through 108.n, for example, set-top boxes and/or wireless access points, within one or more subscriber premises from among the subscriber premises 102.1 through 102.n can aggregate the operational information captured by other subscriber devices from among the subscriber devices 108.1 through 108.n within the one or more subscriber premises to generate the one or more collections of operational information.

After capturing their operational information, one or more of the subscriber devices 108.1 through 108.n can deliver the one or more collections of operational information to the service provider system 104 via the communication network 106. In the exemplary embodiment illustrated in FIG. 1 one or more of the subscriber devices 108.1 through 108.n can deliver the one or more collections of operational information to the service provider system 104 at a discrete period in time, for example, once every few minutes, once every hour, once every few hours, once every day, once every couple of days, once every week, once every couple of weeks, once every month, and/or once every couple of months to provide some examples. In an exemplary embodiment, one or more of the subscriber devices 108.1 through 108.n can deliver the one or more collections of operational information to the service provider system 104 once every twenty-four (24) hours.

In some embodiments, one or more of the subscriber devices 108.1 through 108.n can append configuration information to the one or more collections of operational information. The configuration information can include makes, models, types or brands of the subscriber devices 108.1 through 108.n; one or more identifiers associated with the subscriber devices 108.1 through 108.n, such as network identifiers (IDs), serial numbers, Media Access Controller (MAC) addresses, and/or Internet Protocol (IP) addresses to provide some examples; and/or other suitable characteristics, parameters, and/or attributes that can be used to identify the subscriber devices 108.1 through 108.n that will be apparent to those skilled in the relevant art(s) without departing from the spirit and scope of the present disclosure. In some embodiments, the configuration information can relate to the hardware and/or the software configurations of the subscriber devices 108.1 through 108.n, such as one or more wireless communication standards or protocols and/or one or more wireline communication standards or protocols to be used by the subscriber devices 108.1 through 108.n; configurations and/or arrangements of the subscriber devices 108.1 through 108.n, such as number of antennas, one or more frequency bands of operation, connectivity mode, for example, wired or wireless, data usage in various signal conditions, number of set-top boxes, gateways, routers, network bridges, modems, wireless access points, line drivers, switches, hubs, and repeaters within the subscriber premises 102.1 through 102.n, and/or band steering events for the subscriber devices 108.1 through 108.n, to implement the one or more wireless communication standards or protocols and/or the one or more wireline communication standards or protocols; and/or other suitable characteristics, parameters, and/or attributes that relate to the hardware and/or the software configurations of the one or more subscriber devices that will be apparent to those skilled in the relevant art(s) without departing from the spirit and scope of the present disclosure.

In the exemplary embodiment illustrated in FIG. 1, the service provider system 104 represents one or more computer systems, an exemplary embodiment of which is to be described in further detail below, which facilitate execution of the service. In some embodiments, the service provider system 104 can be implemented in hardware, firmware, software, or any combination thereof. Further, firmware, software, routines, instructions, and/or applications can be described herein as performing certain actions. However, it should be appreciated that such descriptions are merely for convenience and that these actions result from computing devices, processors, controllers, or other devices executing the firmware, software, routines, instructions, and/or applications. As illustrated in FIG. 1, the service provider system 104 can transmit information, for example, video, audio, and/or data, in the downstream direction to the subscriber premises 102.1 through 102.n via the communication network 106 and/or can receive information, for example, video, audio, and/or data, in the upstream direction from the subscriber premises 102.1 through 102.n via the communication network.

In the exemplary embodiment illustrated in FIG. 1, the service provider system 104 can receive the one or more collections of operational information from the subscriber premises 102.1 through 102.n via the communication network 106. In some embodiments, the service provider system 104 can receive the one or more collections of operational information from the subscriber premises 102.1 through 102.n via the communication network 106 at the discrete period in time, for example, once every few minutes, once every hour, once every few hours, once every day, once every couple of days, once every week, once every couple of weeks, once every month, and/or once every couple of months to provide some examples. In an exemplary embodiment, the service provider system 104 can receive the one or more collections of operational information from the subscriber premises 102.1 through 102.n once every twenty-four (24) hours.

As to be described in further detail below, the service provider system 104 can evaluate the one or more collections of operational information to determine one or more Quality of Experience (QoE) scores for one or more subscriber devices from among the subscriber devices 108.1 through 108.n and/or one or more subscriber premises from among the subscriber premises 102.1 through 102.n that are associated with the one or more subscriber devices. Generally, the one or more QoE scores can represent one or more numerically quantitative measures relating to the facilitation of the service by the service provider system 104. In some embodiments, the one or more QoE scores can represent one or more numerically quantitative measures relating to the experience of one or more subscribers that are associated with the one or more subscriber devices. In these embodiments, the one or more QoE scores can represent numerically quantitative measures of the subjective experience, for example, satisfaction or unsatisfaction, of the one or more subscribers with the service. For example, a lower QoE score can indicate that one or more subscribers associated with a subscriber premise from among the subscriber premises 102.1 through 102.n and/or a subscriber device from the one or more subscriber devices having the lower QoE score is expected to be more unsatisfied with the service as compared to other subscriber premises from among the subscriber premises 102.1 through 102.n and/or other subscriber devices from among the one or more subscriber devices having higher QoE scores. As another example, a higher QoE score can indicate that one or more subscribers associated with a subscriber premise from among the subscriber premises 102.1 through 102.*n* and/or a subscriber device from among the one or more subscriber devices having the higher QoE score is expected to be more satisfied with the service as compared to other subscriber premises from among the subscriber premises 102.1 through 102.*n* and/or other subscriber devices from among the one or more subscriber devices having lower QoE scores. In some embodiments, the QoE scores can be used by service personnel of the subscriber network 100 to diagnose and/or troubleshoot errors, faults, and/or failures that are present within the subscriber premises 102.1 through 102.*n* and/or the subscriber network 100. In these embodiments, the service personnel of the subscriber network 100 can utilize the QoE scores, for example, relatively low QoE scores compared to other QoE scores of other subscriber devices with the subscriber network 100, to diagnose the presence of the errors, faults, and/or failures. In these embodiments, the service personnel of the subscriber network 100 can utilize these relatively low QoE scores to determine one or more subscriber devices from among the subscriber devices 108.1 through 108.*n* that are being affected by the errors, faults, and/or failures.

In the exemplary embodiment illustrated in FIG. 1, the communication network 106 communicatively couples the subscriber premises 102.1 through 102.*n* and the service provider system 104. The communication network 106 can implemented as a wireless communication network, a wireline communication network, and/or any combination thereof that will be apparent to those skilled in the relevant art(s) without departing from the spirit and scope of the present disclosure. For example, the communication network 106 can include one or more radio networks, such as terrestrial radio frequency networks or satellite radio frequency networks, one or more coaxial cable networks, and/or one or more fiber optic cable networks.

Exemplary Quality of Experience (QOE) Scoring of Subscriber Devices

FIG. 2 illustrates a flowchart of a first exemplary Quality of Experience (QoE) scoring that can be performed by a service provider system within the exemplary service provider network according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for calculating one or more Quality of Experience (QoE) scores for a subscriber device within a subscriber premise of a subscriber network, such as a subscriber device from among the subscriber devices 108.1 through 108.*n* within a subscriber premises from among the subscriber premises 102.1 through 102.*n* of the subscriber network 100. The operational control flow 200 can be executed by one or more computer systems, such as the service provider system 104 as described above in FIG. 1.

At operation 202, the operational control flow 200 receives a collection of operational information from the subscriber device within the subscriber premise. In some embodiments, the operational control flow 200 receives the collection of operational information over the discrete period in time, for example, once every few minutes, once every hour, once every few hours, once every day, once every couple of days, once every week, once every couple of weeks, once every month, and/or once every couple of months to provide some examples. In the exemplary embodiment illustrated in FIG. 2, the collection of operational information can include multiple segments of operational information that have been periodically captured by the subscriber device at discrete intervals in time, for example, multiple times every day, once every few minutes, once every hour, once every few hours, once every day, once every couple of days, once every week, once every couple of weeks, once every month, and/or once every couple of months to provide some examples, over a discrete period in time, for example, once every few minutes, once every hour, once every few hours, once every day, once every couple of days, once every week, once every couple of weeks, once every month, and/or once every couple of months to provide some examples. In an exemplary embodiment, the collection of operational information can include many thousands of segments of operational information that have been captured by the subscriber device once every five (5) to ten (10) minutes over the twenty-four (24) hour period of time.

At operation 204, the operational control flow 200 assigns one or more reference indicators to the collection of operational information. As described above, the collection of operational information can include the multiple segments of operational information that have been captured by the subscriber device at the discrete intervals in time, for example, once every five (5) to ten (10) minutes, over the discrete period in time, for example, the twenty-four (24) hour period of time. At operation 204, the operational control flow 200 can assign one or more values of one or more fields within each of the multiple segments of operational information to the one or more reference indicators. Generally, the one or more values of the one or more fields can be characterized as being within a range of alphabetical, numerical, and/or alphanumerical values. In some embodiments, the range of alphabetical, numerical, and/or alphanumerical values can be parsed, or separated, into multiple bins of alphabetical, numerical, and/or alphanumerical values with each bin of alphabetical, numerical, and/or alphanumerical values being associated with a corresponding reference indicator from among the one or more reference indicators. At operation 204, the operational control flow 200 determines which bin of alphabetical, numerical, and/or alphanumerical values from among the multiple bins of alphabetical, numerical, and/or alphanumerical values corresponds to the one or more values of the one or more fields of each of the multiple segments of operational information and thereafter assigns the corresponding reference indicator that is associated with this bin of alphabetical, numerical, and/or alphanumerical values to its corresponding segment of operational information from among the multiple segments of operational information.

In some embodiments, the one or more values of the one or more fields can be characterized as being associated with multiple domains of operational information. In these embodiments, the multiple domains of operational information can be characterized including multiple ranges of alphabetical, numerical, and/or alphanumerical values. In these embodiments, the operational control flow 200 can evaluate the collection of operational information to determine one or more characteristics, parameters, and/or attributes of the subscriber device and thereafter selects one or more domains of operational information from among the multiple domains of operational information that are associated with the one or more characteristics, parameters, and/or attributes at operation 204. Thereafter, the operational control flow 200 can select a domain of operational information from among the multiple domains of operational information that is associated with these characteristics, parameters, and/or attributes of the subscriber device.

At operation 206, the operational control flow 200 estimates a cumulative distress score of the subscriber device over the discrete period in time, for example, over the twenty-four (24) hour period of time. Generally, the cumulative distress score of the subscriber device represents an alphabetical, numerical, and/or alphanumerical indictor relating to the operation of the subscriber device which can be characterized as numerically quantifying the subjective experience, for example, unsatisfaction, of subscriber with the service. In some embodiments, a higher cumulative distress score for the subscriber device indicates that the subscriber is more likely to be unsatisfied with the service as compared to a lower distress score. In some embodiments, a lower cumulative distress score for the subscriber device indicates that the subscriber is more likely to be satisfied with the service as compared to a higher distress score.

In the exemplary embodiment illustrated in FIG. 2, the operational control flow 200 can accumulate the one or more values of the one or more fields of the multiple segments of operational information for each of the one or more reference indicators over the discrete period in time, for example, over the twenty-four (24) hour period of time, to generate multiple individual distress scores for the one or more reference indicators over the discrete period in time. In some embodiments, the operational control flow 200 can normalize each of the multiple individual distress scores for each of the one or more reference indicators toward the likelihood that the subscriber is to be unsatisfied with the service. In these embodiments, the operational control flow 200 can normalize the multiple individual distress scores for the one or more reference indicators by one or more numerical values that are related to the likelihood that the subscriber is to be unsatisfied with the service when the subscriber device is operating within its corresponding bin of alphabetical, numerical, and/or alphanumerical values. In an exemplary embodiment, the operational control flow 200 can normalize the one or more individual distress scores for each of the one or more reference indicators by zero (0) when it is likely that the subscriber is be satisfied with the service when the subscriber device is operating within its corresponding bin of alphabetical, numerical, and/or alphanumerical values, one (1) when it is likely that the subscriber is be unsatisfied with the service when the subscriber device is operating within its corresponding bin of alphabetical, numerical, and/or alphanumerical values, and/or a fractional value, for example, three-fourths (¾), representing a ratio of the likelihood that the subscriber is to be unsatisfied with the service and the likelihood that the subscriber is to be satisfied with the service when the subscriber device is operating within its corresponding bin of alphabetical, numerical, and/or alphanumerical values. After normalizing the one or more individual distress scores, the operational control flow 200 can accumulate the normalized one or more individual distress scores for each of the one or more reference indicators to estimate the cumulative distress score of the subscriber device over the discrete period in time, for example, over the twenty-four (24) hour period of time.

In some embodiments, the operational control flow 200 can alternatively, or additionally, estimate a cumulative tranquility score of the subscriber device over the discrete period in time, for example, over the twenty-four (24) hour period of time. Generally, the cumulative tranquility score of the subscriber device represents a numerical indictor relating to the operation of the subscriber device which can be characterized as numerically quantifying the subjective experience, for example, satisfaction, of subscriber with the service. In some embodiments, a higher cumulative tranquility score for the subscriber device indicates that the subscriber is more likely to be satisfied with the service as compared to a lower tranquility score. In some embodiments, a lower cumulative tranquility score for the subscriber device indicates that the subscriber is more likely to be unsatisfied with the service as compared to a higher distress score. The cumulative tranquility score of the subscriber device can be estimated in a substantially similar manner as the cumulative distress score of the subscriber device as discussed above with the cumulative tranquility score being normalized to the likelihood that the subscriber is to be satisfied with the service as opposed to the likelihood that the subscriber is to be unsatisfied with the service.

At operation 208, the operational control flow 200 calculates a Quality of Experience (QoE) score for the subscriber device. As described above, the QoE score can represent a numerically quantitative measure of the subjective experience, for example, satisfaction or unsatisfaction, of a subscriber that is associated with the subscriber device with a service provided by the service provider network. In the exemplary embodiment illustrated in FIG. 2, the QoE score for the subscriber device is related to the cumulative distress score and/or the cumulative tranquility score estimated in operation 206. In some embodiments, the operational control flow 200 determines a percentage distress score and/or a percentage tranquility score representing a ratio between the cumulative distress score and/or the cumulative tranquility score, respectively, and a cumulative value of the one or more values of the one or more fields of the multiple segments of operational information accumulated over the discrete period in time, for example, over the twenty-four (24) hour period of time. In these embodiments, the percentage distress score and/or a percentage tranquility score can be expressed as a fraction, a decimal, a percentage, and/or any other suitable mathematical expression that will be apparent to those skilled in the relevant art(s) without departing from the spirit and scope of the present disclosure. After determining the percentage distress score and/or the percentage tranquility score, the operational control flow 200 can normalize the percentage distress score and/or a percentage tranquility score distress time to a likelihood that the subscriber is to be satisfied with the service, by, for example, subtracting the percentage distress time from one-hundred (100), to determine the QoE score for the subscriber device. In some embodiments, a lower percentage distress score for the subscriber device indicates that the subscriber is more likely to be satisfied with the service as compared to a higher percentage distress score. In these embodiments, the lower percentage distress score can be normalized to a higher QoE score for the subscriber device as compared to the higher percentage distress score which is normalized to a lower QoE score which numerically indicates the likelihood that the subscriber is to be satisfied with the service. Alternatively, or in addition to, the operational control flow 200 can normalize the percentage distress score and/or the percentage tranquility score distress time to a likelihood that the subscriber is to be unsatisfied with the service. In some embodiments, a lower percentage distress score for the subscriber device indicates that the subscriber is more likely to be satisfied with the service as compared to a higher percentage distress score. In these embodiments, the lower percentage distress score can be normalized to a lower QoE score for the subscriber device as compared to the higher percentage distress score which is normalized to a higher QoE score which numerically indicates the likelihood that the subscriber is to be unsatisfied with the service. In some embodiments, the QoE score for the subscriber device calculated at operation 208 represents the QoE score for the subscriber device over the period of time, for example, the twenty-four (24) hour period of time, which corresponds to the collection of operational information. In some embodiments, the operational control flow 200 can revert to operation 202 through operation 208 to calculate the QoE score for the subscriber device for a different collection of operational information.

FIG. 3 further illustrates some of the first exemplary QoE scoring that can according to some exemplary embodiments of the present disclosure. As described above, an operational control flow, such as the operational control flow 200 to provide an example, can receive a collection of operational information from the subscriber device within the subscriber premise. In some embodiments, the collection of operational information can include multiple segments of operational information that have been periodically captured by the subscriber device once every five (5) to ten (10) minutes over a twenty-four (24) hour period of time. Thereafter, the operational control flow can assign one or more reference indicators to the collection of operational information as described above. The discussion of FIG. 3 to follow is to describe an exemplary embodiment for operation 202 through operation 208 as described above in FIG. 2.

As described above in FIG. 2, the operational control flow receives a collection of operational information from the subscriber device within the subscriber premise at operation 202. In the exemplary embodiment illustrated in FIG. 3, the operational control flow receives a collection of operational information 300 that was captured by the subscriber device once every five (5) to ten (10) minutes over the twenty-four (24) hour period of time. As illustrated in FIG. 3, the collection of operational information 300 can include multiple segments of operational information 302.1 through 302.1440 that have been periodically captured by the subscriber device once every five (5) to ten (10) minutes over the twenty-four (24) hour period of time. Each of the multiple segments of operational information 302.1 through 302.1440 can include one or more fields, such as a subscriber device identifier (device_ID), a Received Signal Strength Indicator (RSSI), and a frequency band of operation, to provide some examples, having one or more values. However, those skilled in the relevant art(s) will recognize that the one or more fields can include any of the operational information as described above in FIG. 1 without departing from the spirit and scope of the present disclosure.

As described above in FIG. 2, the operational control flow can assign one or more reference indicators to the collection of operational information at operation 204. In the exemplary embodiment illustrated in FIG. 3, each of the multiple segments of operational information 302.1 through 302.1440 can be characterized as being associated with multiple domains of operational information, for example, with a 2 GHz frequency band of operation 302.1 or 5 GHz frequency band of operation 302.2. As illustrated in FIG. 3, the operational control flow can select the 2 GHz frequency band of operation 302.1 as indicated by the frequency band of operation field when assigning reference indicators BR_Coeff_3 through BR_Coeff_0 to the multiple segments of operational information 302.1 through 302.1440. In the exemplary embodiment illustrated in FIG. 3, the operational control flow can assign each of the multiple segments of operational information 302.1 through 302.1440 to the reference indicator BR_Coeff_3 through BR_Coeff_0. As illustrated in FIG. 3, values for the RSSI field can be characterized as being within a range of RSSI values between less than −75 decibel-milliwatts (dbm) and greater than −55 dbm for the 2 GHz frequency band of operation 302.1. In this exemplary embodiment, the range of RSSI values can include a first bin of numerical values through a fourth bin of numerical values, with the first bin of numerical values being associated with the reference indicator first BR_Coeff_0, the second bin of numerical values being associated with the reference indicator second BR_Coeff_1, the third bin of numerical values being associated with the reference indicator third BR_Coeff_2, and the fourth bin of numerical values being associated with the reference indicator fourth BR_Coeff_3. In this exemplary embodiment, the operational control flow determines which bin of numerical values from among the first bin of numerical values through a fourth bin of numerical values corresponds to a value of the RSSI fields for each of the multiple segments of operational information 302.1 through 302.1440 and thereafter assigns the corresponding BR_Coeff from among the first BR_Coeff_0 through the first BR_Coeff_3 that is associated with this bin of numerical values to its corresponding segment of operation from among the multiple segments of operational information 302.1 through 302.1440. As an example, the operational control flow assigns one of the multiple segments of operational information 302.1 through 302.1440 to the first BR_Coeff_0 when its RSSI field has a value less than −75 dBm, to the second BR_Coeff_1 when its RSSI field has a value between than −75 dBm and −65 dBm, to the third BR_Coeff_2 when its RSSI field has a value between than −65 dBm and −55 dBm, and/or to the fourth BR_Coeff_3 when its RSSI field has a value greater than −55 dBm.

In some embodiments, the operational control flow can select the 5 GHz frequency band of operation 302.2 when indicated by the frequency band of operation field when assigning the reference indicators BR_Coeff_3 through BR_Coeff_0 to the multiple segments of operational information 302.1 through 302.1440. As illustrated in FIG. 3, values for the RSSI field can be characterized as being within a range of RSSI values between less than −78 dbm and greater than −60 dbm for the 5 GHz frequency band of operation 302.2. In these embodiments, the operational control flow assigns one of the multiple segments of operational information 302.1 through 302.1440 to the first BR_Coeff_0 when its RSSI field has a value less than −78 dBm, to the second BR_Coeff_1 when its RSSI field has a value between than −78 dBm and −69 dBm, to the third BR_Coeff_2 when its RSSI field has a value between than −69 dBm and −60 dBm, and/or to the fourth BR_Coeff_3 when its RSSI field has a value greater than −60 dBm.

As described above in FIG. 2, the operational control flow can estimate a cumulative distress score of the subscriber device over the twenty-four (24) hour period of time. In the exemplary embodiment illustrated in FIG. 3, the cumulative distress score of the subscriber device can include a cumulative distress time of the subscriber device and/or cumulative distress throughput of the subscriber device. To estimate the cumulative distress time of the subscriber device, the operational control flow can accumulate the durations of time that the first BR_Coeff_0 through the first BR_Coeff_3 have been assigned to the multiple segments of operational information 302.1 through 302.1440 to provide multiple individual distress times and thereafter normalize the multiple individual distress times for each of the one or more reference indicators by zero (0) when it is likely that the subscriber is be satisfied with the service when the subscriber device is operating within its corresponding bin of numerical values and/or or one (1) when it is likely that the subscriber is be unsatisfied with the service when the subscriber device is operating within its corresponding bin of numerical values. After normalizing the multiple individual distress times, the operational control flow can accumulate the normalized multiple individual distress times for the first BR_Coeff_0 through the fourth BR_Coeff_3 to estimate the cumulative distress score of the subscriber device over the twenty-four (24) hour period of time. As an example, the cumulative distress score of the subscriber device over the twenty-four (24) hour period of time can be estimated as:

$$\text{distress}_{time} = \sum_{i=0}^{1} a_i * t_i, \quad (1)$$

where $\text{distress}_{time}$ represents the cumulative distress time of the subscriber device over the twenty-four (24) hour period of time, $a_i$ represents a normalization coefficient for corresponding to a BR_Coeff_i, and $t_i$ represents the amount of time that the BR_Coeff_i has been assigned to the multiple segments of operational information 302.1 through 302.1440. In some embodiments, the normalization coefficients corresponding to the BR_Coeff_0 and the BR_Coeff_1 is one (1) indicating the subscriber is likely to be unsatisfied with the service when the RSSI field has a value within the first bin of numerical values and the second bin of numerical values and/or the normalization coefficients corresponding to the BR_Coeff_2 and the BR_Coeff_3 is zero (0) indicating the subscriber is likely to be satisfied with the service when the RSSI field has a value within the third bin of numerical values and the fourth bin of numerical values.

To estimate the cumulative distress throughput of the subscriber device, the operational control flow can accumulate throughputs of the subscriber device the first BR_Coeff_0 through the first BR_Coeff_3 to provide multiple individual cumulative distress throughputs and thereafter normalize the multiple individual cumulative distress throughputs for each of the one or more reference indicators by zero (0) when it is likely that the subscriber is be satisfied with the service when the subscriber device is operating within its corresponding bin of numerical values, one (1) when it is likely that the subscriber is be unsatisfied with the service when the subscriber device is operating within its corresponding bin of numerical values, and/or a fractional value, for example, three-fourths (¾), representing a ratio of the probability that the subscriber is to be unsatisfied and the probability that the subscriber is to be satisfied with the service when the subscriber device is operating within its corresponding bin of numerical values. After normalizing the multiple individual cumulative distress throughputs, the operational control flow can accumulate the normalized multiple individual cumulative distress throughputs for the first BR_Coeff_0 through the fourth BR_Coeff_3 to estimate the cumulative distress score of the subscriber device over the twenty-four (24) hour period of throughput. As an example, the cumulative distress score of the subscriber device over the twenty-four (24) hour period of throughput can be estimated as:

$$\text{distress}_{throughput} = \sum_{i=0}^{1} a_i * tr_i, \quad (2)$$

where $\text{distress}_{throughput}$ represents the cumulative distress throughput of the subscriber device over the twenty-four (24) hour period of throughput, $a_i$ represents a normalization coefficient for corresponding to a BR_Coeffi_i, and $tr_i$ represents the throughput of the subscriber device as in indicated by the multiple segments of operational information 302.1 through 302.1440 for the BR_Coeff_i. In some embodiments, the normalization coefficients corresponding to the BR_Coeff_0 and the BR_Coeff_1 is one (1) indicating the subscriber is likely to be unsatisfied with the service when the multiple segments of operational information 302.1 through 302.1440 have values of the first bin of numerical values and the second bin of numerical values, the normalization coefficient corresponding to the BR_Coeff_2 is three-fourths (¾) indicating the subscriber is likely to be twenty five percent unsatisfied with the service and likely to be seventy five percent satisfied with the service when the multiple segments of operational information 302.1 through 302.1440 have values of the third bin of numerical values, and/or the normalization coefficient corresponding to the BR_Coeff_3 is zero (0) indicating the subscriber is likely to be satisfied with the service when the multiple segments of operational information 302.1 through 302.1440 have values of the fourth bin of numerical values.

As described above in operation 208, the operational control flow calculates a Quality of Experience (QoE) score for the subscriber device. In the exemplary embodiment illustrated in FIG. 3, the operational control flow can calculate the QoE score for the subscriber device using the cumulative distress time of the subscriber device and/or cumulative distress throughput of the subscriber device in a substantially similar manner as described above in FIG. 2.

Exemplary Quality of Experience (QOE) Scoring of Subscriber Premises

FIG. 4 illustrates a flowchart of a second exemplary Quality of Experience (QoE) scoring that can be performed by a service provider system within the exemplary service provider network according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for calculating Quality of Experience (QoE) scores for a subscriber premise of a subscriber network, such as a subscriber premises from among the subscriber premises 102.1 through 102.n of the subscriber network 100, to determine one or more QoE scores for the subscriber premises. The operational control flow 400 can be executed by one or more computer systems, such as the service provider system 104 as described above in FIG. 1.

At operation 402, the operational control flow 400 can calculate one or more QoE scores for one or more subscriber devices, such as one or more of the subscriber devices 108.1 through 108.n to provide an example, within a subscriber premises over a discrete period in time, for example, over a twenty-four (24) hour period of time, in a substantially similar manner as described above in FIG. 2 and/or FIG. 3. In some embodiments, the operational control flow 400 can receive and/or retrieve previously calculated QoE scores for one or more subscriber devices.

At operation 404, the operational control flow 400 calibrates the one or more QoE scores for the one or more subscriber devices. As part of this calibrating, the operational control flow 400 can scale the QoE scores for the one or more subscriber devices. In some embodiments, this scaling of the QoE scores can suppress, for example, diminish or even completely cancel, contributions of subscriber devices from among the one or more subscriber devices whose operation does not significantly adversely affect the subjective experience, for example, satisfaction or unsatisfaction, of one or more subscribers with a service provided by the service provider network. As an example, a network capable home automation device, such as a network capable thermostat to provide an example, can represent a subscriber device within the subscriber premises whose operation does not significantly adversely affect the subjective experience, for example, satisfaction or unsatisfaction, of the one or more subscribers with the service. In this example, the QoE score for this network capable home automation device is often lower than other QoE scores for other subscriber devices within the subscriber premises. However, the operation of this network capable home automation device does not significantly adversely affect the subjective experience, for example, satisfaction or unsatisfaction, of the one or more subscribers with the service provided by the service provider network and its QoE score is therefore scaled by the operational control flow 400 at operation 402.

As part of this scaling, the operational control flow 400 can evaluate one or more values of one or more fields, for example, downstream and/or upstream throughputs, within collections of information received from multiple subscriber devices within the subscriber premises over the period of time, for example, the twenty-four (24) hour period of time, to determine one or more premises mean and/or premises median values corresponding to one or more of the multiple subscriber devices. In some embodiments, the operational control flow 400 can evaluate the one or more values of the one or more fields within the collection of information from multiple subscriber devices within the subscriber premises over the period of time, for example, the twenty-four (24) hour period of time to determine one or more subscriber device mean and/or subscriber device median values corresponding to each of one or more subscriber devices. The operational control flow 400 can compare the one or more subscriber device mean and/or subscriber device median values to the one or more premises mean and/or premises median values to determine one or more scaling factors to scale the QoE scores for the one or more subscriber devices. In some embodiments, the operational control flow 400 can scale those QoE scores corresponding to subscriber device mean and/or subscriber device median values that are less than the one or more premises mean and/or premises median values by a first scaling factor, such as 0.25, 0.5, and/or 0.75, to provide some examples, and those QoE scores corresponding to subscriber device mean and/or median values that are greater than the one or more premises mean and/or premises median values by a second scaling factor, such as 0.5 and/or 1 to provide some examples. In this exemplary embodiment, those QoE scores that are scaled by the first scaling factor correspond to QoE scores for subscriber devices within the subscriber premises whose operation does not significantly adversely affect the subjective experience, for example, satisfaction or unsatisfaction, of the one or more subscribers with the service.

Moreover, in some embodiments, the operational control flow 400 can utilize multiple scales having their own scaling factors to scale the QoE scores for the one or more subscriber devices. In an exemplary embodiment, the multiple scales can include, for example:

| Input Antennas/ Output Antennas | Scaling |
|---|---|
| 1 * 1 | if subscriber device median value > premises median value, scaling factor = 0.5, elseif subscriber device median value < premises median value, scaling factor = 0.25 |
| 2 * 2 | if subscriber device median value > premises median value, scaling factor = 1.0, elseif subscriber device median value < premises median value, scaling factor = 0.75 |
| 3 * 3 | scaling factor = 1.0 |

In some embodiments, the operational control flow 400 can evaluate the collection of operational information to determine one or more characteristics, parameters, and/or attributes of each of the one or more subscriber devices. In these embodiments, the operational control flow 400 can analyze the one or more characteristics, parameters, and/or attributes of each of the one or more subscriber devices to determine one or more communication capabilities of each of the one or more subscriber devices. For example, the operational control flow 400 can evaluate the collection of operational information to determine the hardware and/or the software configurations, such as the number of input antennas and output antennas, of each of the one or more subscriber devices as described above in FIG. 1. Thereafter, the operational control flow 400 can select one or more scales that correspond to the one or more communication capabilities of each of the one or more subscriber devices from among the multiple scales to scale the QoE scores for the one or more subscriber devices.

At operation 406, the operational control flow 400 calculates a QoE score for the subscriber premises. As described above, the QoE score can represent a numerically quantitative measure of the subjective experience, for example, satisfaction or unsatisfaction, of a subscriber that is associated with the subscriber premises with a service provided by the service provider network. In the exemplary embodiment illustrated in FIG. 4, the operational control flow 400 can aggregate the QoE scores for the one or more subscriber devices over the discrete period in time, for example, over the twenty-four (24) hour period of time. In this exemplary embodiment, the operational control flow 400 determines a ratio between the aggregated QoE scores over the discrete period in time and the number of subscriber devices having QoE scores within the subscriber premises to generate an elementary QoE score for the subscriber premises that corresponds to the discrete period in time. Thereafter, the operational control flow 400 accumulates elementary QoE scores for the subscriber premises over another discrete period in time, for example, every day, once every couple of days, once every week, once every couple of weeks, once every month, and/or once every couple of months to provide some examples to generate an accumulated QoE score for the subscriber premises over the other discrete period in time. In an exemplary embodiment, the operational control flow 400 accumulates elementary QoE scores for the subscriber premises over a one (1) week period of time. In this exemplary embodiment, the operational control flow 400 determines accumulated QoE scores for the subscriber premises over the other discrete period in time and a duration, or length, of the other discrete period in time generate the QoE score for the subscriber premises over the other discrete period in time.

Exemplary Computer System that can be Utilized within the Exemplary Wireless Network FIG. 5 graphically illustrates a simplified block diagram of a computer system suitable for use with embodiments described herein, as well as circuit design and circuit embodiments of the technology, according to some exemplary embodiments of the present disclosure. A service provider system, such as the service provider system 104 as described above in FIG. 1 can be implemented in hardware, firmware, software, or any combination thereof. The discussion of FIG. 5 to follow describes an exemplary computer system 510 that can be used for this service provider system.

In the exemplary embodiment illustrated in FIG. 5, the computer system 510 typically includes at least one processor 514 which communicates with a number of peripheral devices via bus subsystem 512. Typically, the at least processor 514 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 5, these peripheral devices may include a storage subsystem 524, comprising a memory subsystem 526 and a file storage subsystem 528, user interface input devices 522, user interface output devices 520, and a network interface subsystem 516. The input and output devices allow user interaction with computer system 510. In the exemplary embodiment illustrated in FIG. 5, the network interface subsystem 516 provides an interface to outside networks, including an interface to a communication network 518, and is coupled via a communication network 518 to corresponding interface devices in other computer systems or machines. The communication network 518 may comprise many interconnected computer systems, machines and communication links. These communication links may be wired links, optical links, wireless links, or any other devices for communication of information. The communication network 518 can be any suitable computer network, for example a wide area network such as the Internet, and/or a local area network such as Ethernet. The communication network 518 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 522 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into the computer system 510 or onto the communication network 518. The user interface input devices 522 typically allow a user to select objects, icons, text and the like that appear on some types of user interface output devices, for example, a display subsystem.

The user interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 510 to the user or to another machine or computer system.

The memory subsystem 526 typically includes a number of memories including a main random-access memory ("RAM") 530 (or other volatile storage device) for storage of instructions and data during program execution and a read only memory ("ROM") 532 in which fixed instructions are stored. The file storage subsystem 528 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 528.

The bus subsystem 512 provides a device for letting the various components and subsystems of the computer system 510 communicate with each other as intended. Although the bus subsystem 512 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A service provider server within a service provider network for calculating a Quality of Experience (QoE) score for a subscriber device within the service provider network, the service provider server comprising:
    a memory that stores instructions; and
    a processor configured to execute the instructions, the instructions, when executed by the processor, configuring the processor to:
        receive a collection of operational information from the subscriber device, the collection of operational information including a plurality of values that were captured by the subscriber device at discrete intervals in time over a discrete period of time,
        assign the plurality of values to corresponding reference indicators from among a plurality of reference indicators,
        accumulate a number of times that the plurality of values have been assigned to each of the plurality of reference indicators over the discrete period in time to estimate a plurality of individual distress scores,
        normalize the plurality of individual distress scores towards a subjective experience of a subscriber associated with the subscriber device with a service of the service provider network,
        accumulate the normalized plurality of individual distress scores to estimate a cumulative distress score of the subscriber device over the discrete period in time, and
        calculate the QoE score for the subscriber device based upon a ratio between the cumulative distress score and a cumulative number of values of the plurality of values.

2. The service provider server of claim 1, wherein the plurality of values are within corresponding ranges of values from among a plurality of ranges of values,
    wherein the plurality of reference indicators are associated with different ranges of values from among the plurality of ranges of values, and
    wherein the instructions, when executed by the processor, configure the processor to:
        assign the plurality of values to the corresponding reference indicators that are associated with their corresponding ranges of values.

3. The service provider server of claim 1, wherein the instructions, when executed by the processor, configure the processor to normalize the plurality of individual distress scores in accordance with a plurality of numerical values that are related to a likelihood that the subscriber is to be unsatisfied with the service.

4. The service provider server of claim 3, wherein the plurality of numerical values comprises:
    a first numerical value corresponding to the likelihood that the subscriber is to be unsatisfied with the service, a second numerical value corresponding to a likelihood that the subscriber is to be satisfied with the service, and a third numerical value corresponding to a ratio of the likelihood that the subscriber is to be unsatisfied with the service and the likelihood that the subscriber is to be satisfied with the service.

5. The service provider server of claim 1, wherein the subjective experience of the subscriber comprises a likelihood that the subscriber is to be unsatisfied with the service.

6. The service provider server of claim 1, wherein the cumulative distress score comprises a cumulative distress time, and
wherein the instructions, when executed by the processor, configure the processor to:
accumulate a number of times that a plurality of durations of time have been assigned to each of the plurality of reference indicators over the discrete period in time to estimate a plurality of individual distress times for the plurality of reference indicators,
normalize the plurality of individual distress times towards the subjective experience of the subscriber, and
accumulate the normalized plurality of individual distress times to estimate the cumulative distress time of the subscriber device over the discrete period in time.

7. The service provider server of claim 1, wherein the cumulative distress score comprises a cumulative distress throughput, and
wherein the instructions, when executed by the processor, configure the processor to:
accumulate a number of times that a plurality of throughputs have been assigned to each of the plurality of reference indicators over the discrete period in time to estimate a plurality of individual distress throughputs for the plurality of reference indicators,
normalize the plurality of individual distress throughputs towards the subjective experience of the subscriber, and
accumulate the plurality of normalized individual distress throughputs to estimate the cumulative distress throughput of the subscriber device over the discrete period in time.

8. The service provider server of claim 1, wherein the instructions, when executed by the processor, configure the processor to:
determine a percentage distress score representing a ratio between the cumulative distress score and the cumulative number of values, and
normalize the percentage distress score to a likelihood that the subscriber is to be satisfied with the service to estimate the QoE score for the subscriber device.

9. A method for calculating a Quality of Experience (QoE) score for a subscriber device within a service provider network, the method comprising:
receiving, by a service provider server within the service provider network, a collection of operational information from the subscriber device, the collection of operational information including a plurality of values that were captured by the subscriber device at discrete intervals in time over a discrete period of time;
assigning, by the service provider server, the plurality of values to corresponding reference indicators from among a plurality of reference indicators;

accumulating, by the service provider server, a number of times that the plurality of values have been assigned to each of the plurality of reference indicators over the discrete period in time to estimate a plurality of individual distress scores;
normalizing, by the service provider server, the plurality of individual distress scores towards a subjective experience of a subscriber associated with the subscriber device with a service of the service provider network;
accumulating, by the service provider server, the normalized plurality of individual distress scores to estimate a cumulative distress score of the subscriber device over the discrete period in time; and
calculating, by the service provider server, the QoE score for the subscriber device based upon a ratio between the cumulative distress score and a cumulative number of values of the plurality of values.

10. The method of claim 9, wherein the plurality of values are within corresponding ranges of values from among a plurality of ranges of values,
wherein the plurality of reference indicators are associated with different ranges of values from among the plurality of ranges of values, and
wherein the assigning comprises assigning the plurality of values to the corresponding reference indicators that are associated with their corresponding ranges of values.

11. The method of claim 9, wherein the normalizing comprises normalizing the plurality of individual distress scores in accordance with a plurality of numerical values that are related to a likelihood that the subscriber is to be unsatisfied with the service.

12. The method of claim 11, wherein the plurality of numerical values comprises:
a first numerical value corresponding to the likelihood that the subscriber is to be unsatisfied with the service,
a second numerical value corresponding to a likelihood that the subscriber is to be satisfied with the service, and
a third numerical value corresponding to a ratio of the likelihood that the subscriber is to be unsatisfied with the service and the likelihood that the subscriber is to be satisfied with the service.

13. The method of claim 9, wherein the subjective experience of the subscriber comprises a likelihood that the subscriber is to be unsatisfied with the service.

14. The method of claim 9, wherein the cumulative distress score comprises a cumulative distress time,
wherein the accumulating the number of times comprises accumulating a number of times that a plurality of durations of time have been assigned to each of the plurality of reference indicators over the discrete period in time to estimate a plurality of individual distress times for the plurality of reference indicators,
wherein the normalizing comprises normalizing the plurality of individual distress times towards the subjective experience of the subscriber, and
wherein the accumulating the normalized plurality of individual distress scores comprises accumulating the normalized plurality of individual distress times to estimate the cumulative distress time of the subscriber device over the discrete period in time.

15. The method of claim 9, wherein the cumulative distress score comprises a cumulative distress throughput, and
wherein the accumulating the number of times comprises accumulating a number of times that a plurality of throughputs have been assigned to each of the plurality of reference indicators over the discrete period in time to estimate a plurality of individual distress throughputs for the plurality of reference indicators, wherein the normalizing comprises normalizing the plurality of individual distress throughputs towards the subjective experience of the subscriber, and wherein the accumulating the normalized plurality of individual distress scores comprises accumulating the plurality of normalized individual distress throughputs to estimate the cumulative distress throughput of the subscriber device over the discrete period in time.

16. The method of claim 9, further comprising:

determining a percentage distress score representing a ratio between the cumulative distress score and the cumulative number of values; and normalizing the percentage distress score to a likelihood that the subscriber is to be satisfied with the service to estimate the QoE score for the subscriber device.

* * * * *